(12) United States Patent
Finn

(10) Patent No.: US 6,312,649 B2
(45) Date of Patent: *Nov. 6, 2001

(54) BIO-TOWER

(75) Inventor: Larry J. Finn, Marietta, GA (US)

(73) Assignee: Bedminster AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/530,975
(22) PCT Filed: Nov. 2, 1998
(86) PCT No.: PCT/US98/23188
  § 371 Date: May 8, 2000
  § 102(e) Date: May 8, 2000
(87) PCT Pub. No.: WO99/25460
  PCT Pub. Date: May 27, 1999

Related U.S. Application Data

(60) Provisional application No. 60/066,045, filed on Nov. 14, 1997.

(51) Int. Cl.[7] ................................. B01D 53/85
(52) U.S. Cl. ............. 422/169; 422/170; 422/171; 423/266; 423/290.1; 423/299.1
(58) Field of Search ............... 422/170–171, 422/176, 177, 168–169; 423/230, 244.01; 95/187, 189, 197, 211; 96/235–236, 290, 297; 435/266, 299, 290.1; 210/150, 617

(56) References Cited

U.S. PATENT DOCUMENTS

| | | | |
|---|---|---|---|
| 4,671,807 | * | 6/1987 | Charlton ................................. 96/2 |
| 5,236,677 | * | 8/1993 | Torres-Cardona et al. .......... 423/230 |
| 5,660,615 | * | 8/1997 | Neumann et al. ..................... 95/187 |

* cited by examiner

*Primary Examiner*—Hien Tran
(74) *Attorney, Agent, or Firm*—Stanley H. Zeyher

(57) ABSTRACT

A unitary structure containing a vertically integrated system for deodorizing composting gaseous effluents using scrubbers packed with means providing both extensive surface area for microorganism growth sites and cascading dispersion of microorganism-impregnated liquid media while concomitantly providing sufficient void space to permit substantially unimpeded flow of effluents undergoing treatment within the system.

2 Claims, 1 Drawing Sheet

U.S. Patent

Nov. 6, 2001

US 6,312,649 B2

BIO-TOWER

Figure 1:
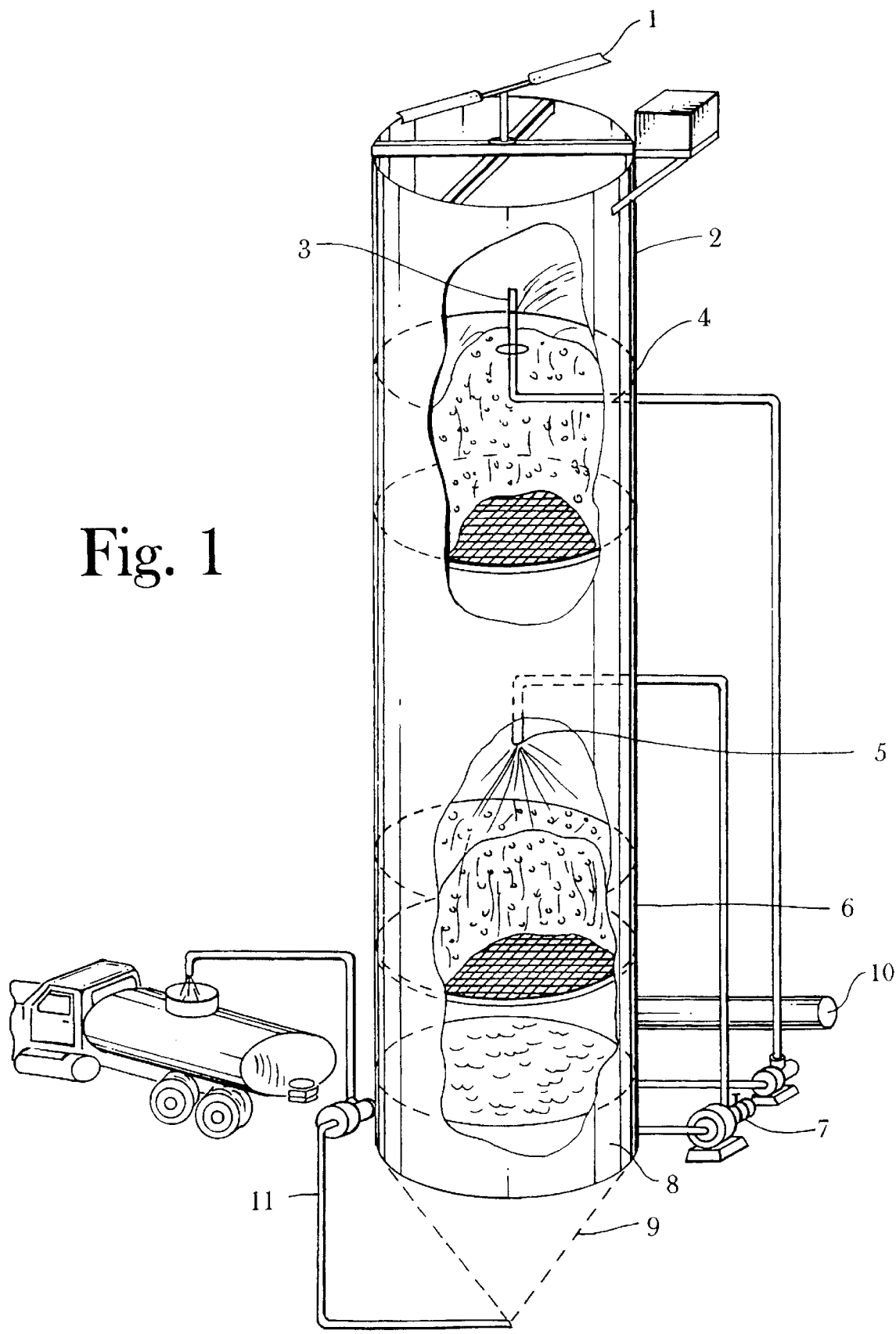

This application is a 371 of PCT/US98/23188 filed Nov. 2, 1998 which claims benefit of Prov. No. 60/066,045 filed Nov. 14, 1997.

FIELD OF INVENTION

This invention relates generally to apparatus for removing odors from gaseous emissions and more particularly to an odor control system for use in the treatment of effluents from composting facilities.

BACKGROUND OF THE INVENTION

Industrial processes such as food processing, chemical production and solid waste composting have long been plagued by the generation of odors and the release of volatile organic compounds (VOC's). While many methods of chemical scrubbing and air treatment exist, few, if any are both effective and affordable.

The present invention is, in part, an integration of technologies housed in a readily available and affordable structure, such for example as a concrete farm silo. The incorporation of multiple odor controlling techniques into a compact cylindrical structure results in an economical and highly efficient odor reducing system which when combined with a unique air venting system results in both dilution and dispersion of offensive and noxious odors.

SUMMARY OF THE INVENTION

The invention in its fully integrated form comprises a concrete silo which in the context of the invention acts as a chimney having a nominal height of 50 to 100 feet. Such a structure acts to dilute and disperse malodorous effluents, a function which has long been understood and which for decades was the sole instrument of pollution remediation used by power plants and other chemical and dust generators. Mounted on top of the silo is a helicopter size fan. The addition of this element effectively adds 400 to 500 feet of height to the stack by producing a vertical wind column extending 20 to 30 fan diameters above the fan blades. Additionally the fan can be designed to produce up to 850,000 cubic feet per minus (cfm) which will volumetrically dilute the effluents with fresh air as much as twenty times.

The silo, to augment its efficiency in the removal of odors, incorporates multi-layered, packed-bed, wet bioscrubbers. The silo is additionally constructed to include an oxidation chamber. It is well understood that the oxidation of organic compounds is effected most rapidly in a well oxygenated liquid medium. The rapid circulation of the liquid over the packed wet bed scrubber, through which a high rate of air is caused to pass will serve to keep the liquid saturated with oxygen. Since the system as described will generate large volumes of bio-mass the silo is constructed with a lower chamber which serves as a sludge settling tank. The excess biomass will gravitate to the bottom of the chamber where it will be concentrated into a sludge. The sludge in turn is siphoned off and treated as a biosolid.

DRAWING

For purposes of illustrating the invention, there is shown a preferred embodiment of, it being understood, however, that the invention is not limited to the precise embodiment shown or application described.

The single FIGURE depicts a concrete silo equipped to function as an odor reduction unit when constructed in the unique manner comprising the subject invention.

DETAILED DESCRIPTION OF A PREFERRED EMBODIMENT

Referring now to the drawing there is shown a system designed to treat 50,000 to 75,000 cfm of malodorous effluent. A helicopter size fan 1, designed to achieve up to a 20 to 1 dilution factor has a design output of 850,000 cfm . The silo 2 as previously noted is of concrete or steel construction and is nominally 20 feet in diameter and 50 to 100 feet in height. Disposed intermediate its height is a sprinkler nozzle 3 overlying a packed-bed wet bioscrubber 4 occupying from 4 to 6 feet of the silo's height. The packed bed bioscrubber shown is depicted as a single layer unit but can be replicated throughout the height of the silo as many times as required to obtain the necessary detention time.

Disposed below the upper packed-bed bioscrubber is a second bioscrubber comprised of a water distribution system 5, a packed-bed 6, and a high flow recirculation pump 7. A packed-bed wet bioscrubber when operated in a nearly flooded bed condition can remove up to 50% of the VOC's contained in an air stream. Both packed-bed bioscrubbers are equipped with synthetic media having a high surface area, a high percentage of void space in the 90+% range, and an open structure so as not to be blinded by the biomass of microorganisms that will inevitably grow on the structure of the media. As previously noted the containment structure is desirably cylindrical in configuration. Each bioscrubber is packed with means such as Pall Rings,Tellerette or Jaeger Tri-Pack type media to provide extensive surface area to cause cascading dispersion of the water to form a water curtain to optimize the absorption of VOC's. Gaseous emissions from the lower bioscrubber 6 are next passed through the upper bioscrubber 4 before being entrained in the air stream produced by fan 1 for dilution and high altitude dispersion.

As previously noted detention time in the above-described system can be adjusted to effect the desired degree of VOC removal. A detention time of 10 seconds is effective for primary VOC removal of up to 50%. Detention time of 50 seconds can achieve 90–95% of VOC removal.

The bioscrubbers overlie an oxidation chamber 8, at the bottom of which is a sludge settling tank 9 . Effluent air to be treated is fed through an air inlet pipe 10. As has been mentioned the high rate oxidation chamber will generate large volumes of biomass which will gravitate to the bottom of the chamber as sludge which is periodically withdrawn from the tank through a sludge removal pipe 11 as shown.

It should be understood that while the invention has been illustrated and described in connection with a specific application the method and apparatus of controlling odor herein described can be modified to meet numerous and varied circumstances without departing from the teaching of the invention as defined in the appended claims.

I claim:

1. A unitary structure for deodorizing gaseous effluents comprising: a vertically oriented cylinder structure having disposed along its height one or more scrubbers packed with means providing an extensive surface area both to provide growth sites for microorganisms and cascading dispersion of liquid media while concomitantly providing a high percentage of void space to permit substantially unimpeded flow of gaseous effluents undergoing treatment; an oxidation chamber for containment of liquid media disposed beneath said scrubbers; means for circulating liquid media from said oxidation chamber over said scrubbers; a sludge settling tank located beneath the oxidation chamber; means for removing sludge from the settling tank; means for admitting gaseous effluent to be deodorized into said structure; and fan means positioned at the top of said structure for drawing effluent through said scrubbers and for diluting and dispersing deodorized effluent into the atmosphere.

2. Means for deodorizing composting gaseous effluents comprising: a vertically oriented cylindrical structure having disposed along its height a bioscrubber packed with means providing both extensive growth sites for microorganisms and cascading dispersion of liquid; an oxidation chamber for containing microorganism impregnated liquid media disposed beneath said bioscrubber; means for circulating the liquid media from said oxidation chamber over said bioscrubber; a sludge settling tank located beneath the oxidation chamber; means for removing sludge from the settling tank; means for admitting gaseous effluent to be deodorized into said cylindrical structure for passage therethrough; and fan means of the top at said structure for drawing the effluent through said bioscrubber and for diluting and dispersing the deodorized effluent into the atmosphere.

* * * * *